(12) United States Patent
Chen

(10) Patent No.: US 11,528,460 B2
(45) Date of Patent: Dec. 13, 2022

(54) METHOD OF AUTOMATIC KEYSTONE CORRECTION FOR PROJECTOR SYSTEM

(71) Applicant: Chin-Chau Chen, Kaohsiung (TW)

(72) Inventor: Chin-Chau Chen, Kaohsiung (TW)

( * ) Notice: Subject to any disclaimer, the term of this patent is extended or adjusted under 35 U.S.C. 154(b) by 0 days.

(21) Appl. No.: 17/509,044

(22) Filed: Oct. 24, 2021

(65) Prior Publication Data

US 2022/0201262 A1 Jun. 23, 2022

(30) Foreign Application Priority Data

Dec. 23, 2020 (TW) .................. 109145815

(51) Int. Cl.
*G03B 21/14* (2006.01)
*H04N 9/31* (2006.01)

(52) U.S. Cl.
CPC ......... *H04N 9/3185* (2013.01); *G03B 21/147* (2013.01); *H04N 9/3194* (2013.01)

(58) Field of Classification Search
CPC ........ G03B 21/14; G03B 21/147; H04N 9/31; H04N 9/3185; H04N 9/3194; H04N 9/3191

USPC ....................................................... 353/69, 70
See application file for complete search history.

(56) References Cited

U.S. PATENT DOCUMENTS

| | | | | |
|---|---|---|---|---|
| 6,520,647 B2 * | 2/2003 | Raskar | ................. | H04N 9/3185 353/69 |
| 8,398,246 B2 * | 3/2013 | Rutledge | ............... | H04N 9/3185 353/69 |
| 8,425,050 B2 * | 4/2013 | Furui | .................... | H04N 9/3185 353/121 |
| 9,445,066 B2 * | 9/2016 | Inoue | .................... | H04N 9/3191 |
| 10,578,955 B2 * | 3/2020 | Chiba | .................. | H04N 9/3185 |
| 2014/0071252 A1 * | 3/2014 | Cuisenier | ............. | H04N 9/3194 348/51 |

\* cited by examiner

*Primary Examiner* — William C. Dowling

(57) ABSTRACT

An automatic keystone correction method for projector system includes obtaining full field of view coordinates of a projecting picture being projected to a plane by a time of flight (TOF) ranging device as a first reference picture, utilizing the Gravity sensor to calibrate TOF scanning time deviation, and constructing a motion virtual line of a fixed field of view (FOV) through calibrating its horizontal and vertical angle to implement a rectangle adjustment function.

20 Claims, 5 Drawing Sheets

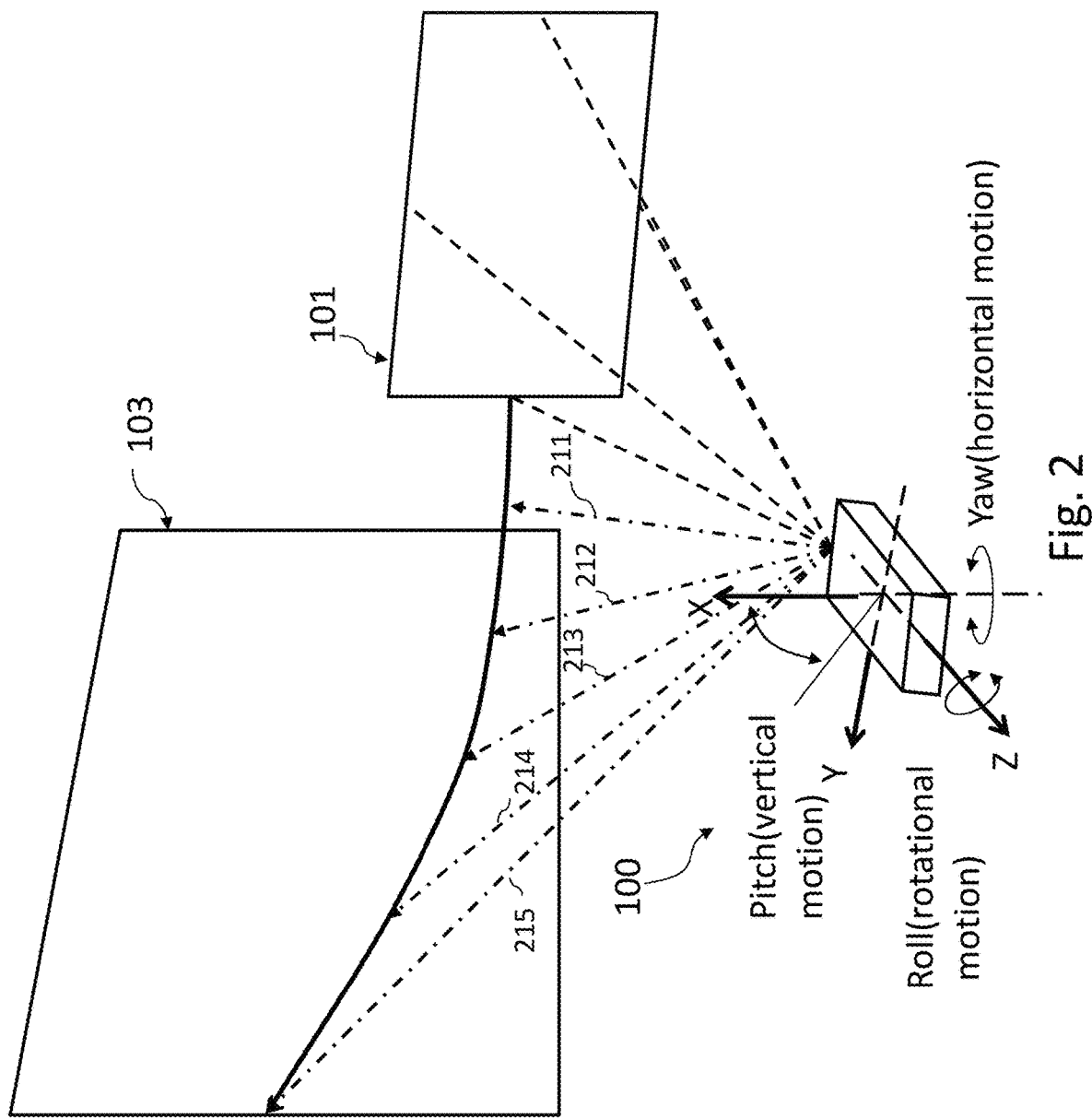

METHOD OF AUTOMATIC KEYSTONE CORRECTION FOR PROJECTOR SYSTEM

TECHNICAL FIELD

The invention relates to a picture correction method of a projector system, in particular to a projector system that performs automatic keystone correction without generating patterns or positioning coordinates.

BACKGROUND

With the progress of science and technology, various types of projection (micro projection) technology have improved the flexibility and mobility of its application in response to the evolution of science and technology. The projection technology for large picture, high resolution, light, unrestricted space and easy to carry has been inseparable from life. While the above projection technology expands its unlimited possibilities of application in the family and public fields, its indoor and outdoor applications may cause horizontal and vertical picture deflection and trapezoidal picture distortion due to limited surrounding environment or normal mobile erection. Especially, the short focus system is most affected. When the expanded field of view (FOV) angle is larger, the adjustment will become more difficult due to its delicate changes.

In addition to manual adjustment, some of current projectors already have the method of automatic correction. The traditional method of automatic correction is performed by using the method of generating image positioning coordinates, obtaining the rectangular offset coordinates through a separate camera (such as mobile phone) or a camera fixed to the projector, and then calculating the four corners points correction. However, the execution efficiency of this method is poor, because it is vulnerable to the influence of ambient background light, and even limited by frame conditions or materials of projection screen. The accuracy of automatic correction is often affected by the external environment, resulting in unstable quality, complex positioning conditions and high cost. The projector using fixed camera is more difficult to apply to micro projection technology, because it is limited by the fact that the lens and camera cannot take the same FOV angle, the resolution must be improved at a relatively short angle, and the factor of cost makes it difficult to popularize.

SUMMARY OF THE INVENTION

Based on the above deficiencies, the invention proposes a projector system which can perform a process of fully automatic picture correction. The system may be made as a small module, does not need a camera and is not limited by the installation angle of FOV. It is installed on the same projector body, is not easy to be affected by the environment, background light source or uneven wall surface. Further, it does not need a frame and is not limited by the projection screen. The process (method) uses a gravity sensor and a time of flight (TOF) ranging device to correct the error perpendicular to the normal line; after moving to the fixed point, the dynamic micro adjustment can be completed at a speed of less than 0.3 sec to the best position, and it is no longer necessary to make repeated adjustment due to picture masked by the generated image.

Another embodiment of the invention is applied to an ultra-short throw projector to overcome the problem that the TOF ranging device will produce a large error rate when taking the FOV line in a short distance. It uses the installation mode of tilting the horizontal and vertical angles on the projector to maintain the fixed horizontal and vertical angles of the FOV and enlarge the difference ratio of the diagonal. It can compensate the FOV error rate of the ultra-short throw projector on the forward projection picture and achieve the same accurate effect as the general focal length.

In order to achieve the purpose of vertical or all adjustment of FOV, the embodiment of the invention proposes a single projector, a projection plane and a processor developed by the invention. The single projector can project images in any direction angle, and the processor developed by the invention calculates an included angle between the horizontal and vertical normal line of the FOV of projection picture of the projector. The direction of the processor and the projector based on the same axis point of vertical and horizontal rotation is taken to detect the trapezoidal deformation of synchronous projection imaging, so that the deformation correction adjusted by the processor can achieve the purpose of positive rectangle and maintain the original aspect ratio.

The main concept of the invention is to obtain the horizontal and vertical offset after the trapezoidal deformation of the field of view (FOV), which can be applied to the projection technology of any focal length (including ultra-short focus) and any type of light source, and the system with trapezoidal correction can be directly combined to complete the trapezoidal correction in a projection plane without adding other positioning or coordinates reading device. The processor takes about a few seconds to complete the first positioning, and can start cyclic dynamic and static detection. For the using process of the projector, or the steps of erection before using the projector or preset of environmental requirements, there will be no need for any manual intervention, and the purpose of full-automatic correction can be achieved. The invention can be realized by using a nine axes gravity sensor (three-axes acceleration, three-axes angular velocity and three-axes magnetometer), introducing a three-axes magnetic force calculation method to obtain the change rate of Euler angle and the influence of angular velocity, construct a detection adapted to environmental changes, achieve a directional projection function similar to the North compass effect. The invention can output a rotational inertia to the cloud platform, used in an exhibition hall or a mobile vehicle.

BRIEF DESCRIPTION OF THE DRAWINGS

FIG. 2 shows a schematic diagram of the principle of dynamic correction of the invention.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
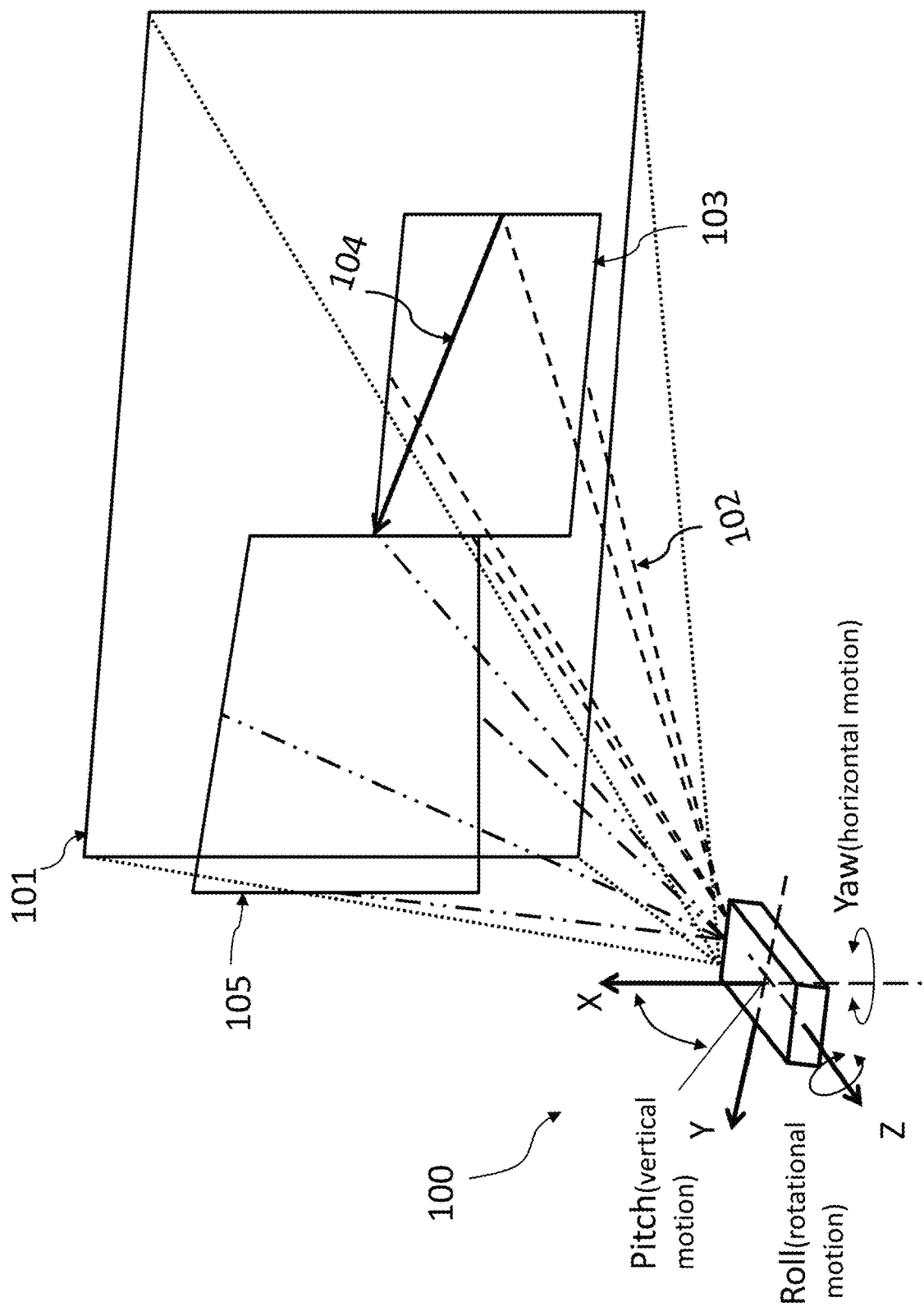
FIG. 1 shows a system diagram of dynamic offset of the invention.
Figure 3A:
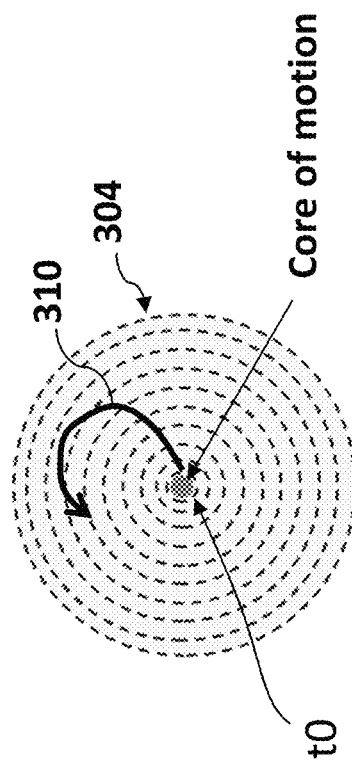
FIG. 3A-3D shows a schematic diagram of principle of anti-jitter of the invention.
Figure 3B:
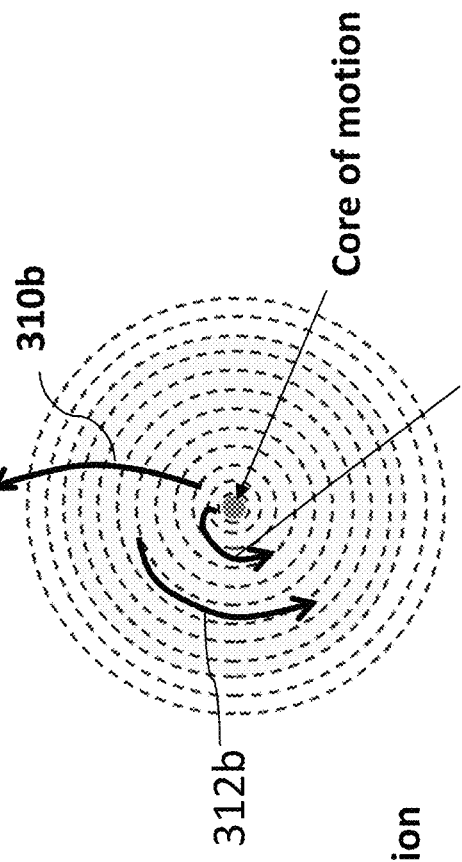
Figure 3C:
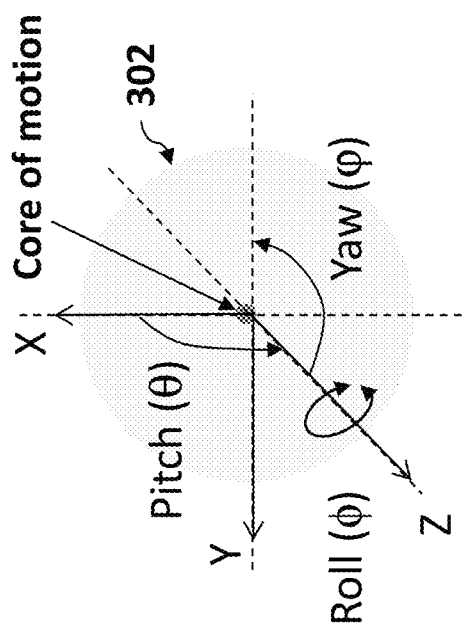
Figure 3D:
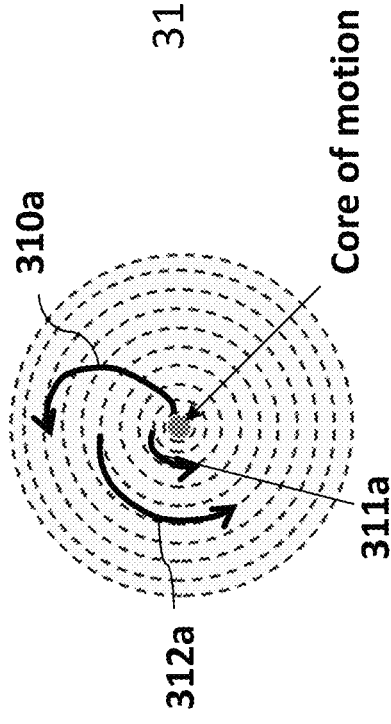

FIG. 1 shows a system diagram of dynamic offset of the invention. The processor of the invention is fixedly configured on the projection imaging system of a projector. The projection imaging system of the projector is provided with hardware required for projection, such as light source, mirror in the optical system, a gravity sensor (integrated with accelerometer and gyro) and related control circuits. Therefore, the processor of the system is fixed on the projection imaging system of the projector to integrate as a projector system 100, which has an identical local coordinate system, which can define the three-axes direction (X, Y, Z direction), pitch angle, yaw angle and roll angle based on the set orientation of the gravity sensor. The projector system includes a projector, a processor and an imageable plane, wherein the imageable plane can be a wall, a projection screen, a convex wallpaper/decoration material, or other flat plane suitable for viewing a projection picture 101. The primary consideration is how to correct the projector system when the deflection of horizontal and vertical picture of the projector system is caused by tilt and vibration, resulting in trapezoidal picture distortion. Here, the correction methods of static, static to dynamic and dynamic to static are proposed. The method uses a gravity sensor and a time of flight (TOF) ranging device to correct the error perpendicular to the normal line; after moving to the fixed point, the dynamic micro adjustment can be completed at a speed of less than 0.3 sec to the best position, and it is no longer necessary to make repeated adjustment due to picture masked by the generated image. The first field of view (FOV) 103 of the projector system (processor) is represented as the FOV obtained in the previous dynamic or static state, and the included angle between horizontal and vertical can be obtained by sampling the four sides to measure the length (i.e. measuring lines 102 of the four sides of an origin point marked in the figure). The second imaging field of view (FOV) 105 of the projector system (processor) represents the next dynamic or static FOV, in which the change rate of Euler angle and attitude quaternion are calculated from the gravity sensing (including three-axes acceleration and three-axes angular velocity) in the obtained dynamic FOV to construct a new measuring line, and then the TOF ranging device measuring points to obtain the measurement length of four sides and the fixed included angle of FOV. The above step is repeated in continuous dynamic behavior. In a preferred embodiment, the TOF ranging device can be a scanning multipoint TOF ranging device. In a preferred embodiment, the projector system of the invention can be combined with any type of projector, such as laser projector, digital optical processing projector, short focus projector or other type of projector. Other devices with planar imaging or positioning can also be applied to the projector system of the present invention. For the application of the projector, the projector system of the invention is usually provided with a single processor. As a large projection coverage is required or more accurate fine-tuning is needed in the ultra-short throw projector, a plurality of processors can be installed. In a preferred embodiment, the processor of the invention can be a computer central processing device, a microprocessor, a logic operation unit (Field Programmable Gate Array: FPGA), or integrated into a projector, such as a built-in Scalar embedded microprocessor. In a preferred embodiment, any reasonable projector technology or hardware integrating gravity sensor and TOF ranging device belongs to the scope of the projector system disclosed in the present invention.

FIG. 2 shows a schematic diagram of the principle of dynamic correction proposed by the invention, which discloses the change of the moving curve of the invention. The principle of the dynamic correction indicates the fact that the projector system (processor and projector) of the invention is fixed on the same three-axes normal line, so that the FOV rectangle of the projection picture changes to an equivalence, and therefore it is depicted on the identical imaging plane. In the invention, the displacement operation of the projector or device is performed after the first imaging positioning is started and completed. After the mis-operation is eliminated through anti-jitter operation, the real-time dynamic calculation, ranging line sampling and compensating the time difference are performed to achieve the effect of real-time correction, and accurate correction after the device stabilizes the projection angle, so as to obtain the peripheral line and the absolute distance of the center point through TOF. The full expansion within the difference of fixed included angle and the accurate angle correction of center point to four-points expansion is calculated to obtain the horizontal and vertical included angles between the processor and the projection plane of the projector system. The relevant anti-jitter operation will be detailed in FIG. 3.

In FIG. 2, the horizontal and vertical movement (creating new position) 104 of the projector system 100 is represented by the offset of the first imaging field 103 to the second imaging field 105. The diagram shows that five sampling lines (211, 212, 213, 214 and 215) are measured in horizontal and vertical direction in a fixed period of time, and the change rates of Euler angle are calculated respectively to obtain the rotation angles in the pitch angle and yaw angle directions. The horizontal and vertical changes of each sampling line are dynamically changed based on the origin point of the first imaging angle. The sampling line can be sampled in a continuous time, which extends depending on the performing time, and there is no limit on the number of sampling lines. As shown in FIG. 1 and FIG. 2, the technical features of the invention are first static followed by dynamic and the presentation of a FOV angle correction system of recurring automatic supplement, in which the static converting to dynamic detection is mainly based on the gravity sensor, which can supplement the unreliability of distortion of accuracy caused by the movement measurement of TOF ranging device. The FOV imaging of real-time projection plane in dynamic recovering to static is to correct the final included angle between horizontal and vertical directions by measuring the four sides and center line with TOF ranging device, so as to obtain de-trapezoidal and maintain the projection aspect ratio. Any approach to achieve the cumulative included angle and angle correction relationship between the horizontal and vertical directions by reasonably changing the change rate of Euler angle also belongs to the scope of the invention.

FIG. 3 is a schematic diagram of the principle of anti-jitter proposed by the present invention, which is depicted in the spherical space (phase space) under limited time motion. The concept of the invention is to calculate the Euler angular velocity sensed by gravity, and the sensor stimulated by external force will produce the change of displacement by the three-axes motion (i.e. motion in X, Y and Z directions) around the core of motion in a period of time, and thereby forming the change of acceleration and gravity value, and then calculating the pitch angle, yaw angle and roll angle (in the coordinate system, pitch angle corresponding to θ, yaw angle corresponding to φ and roll angle corresponding to ϕ) and their corresponding intensity. FIG. 3A illustrates the motion intensity and corresponding coordinate system of the three axes, and shows the corresponding relationship between the three motion angles of pitch angle, yaw angle, roll angle and the three axes. The origin point indicates the core of motion, the Euler angle of vertical motion represents the angle change rate of pitch direction, the Euler angle of horizontal motion represents the angle change rate of yaw direction, and the Euler angle of lateral rotation represents the angle change rate of roll direction. The boundary of the spherical represents the invalid jitter range in the limited time motion space 302; that is, the outside of the spherical boundary is an effective motion. FIG. 3B shows an illustration of the time evolution of the motion intensity of a single axis. Taking the horizontal motion as an example (yaw angle change rate of yaw direction), the dotted concentric circle extending outward from the core of motion indicates the displacement increment Δr with a fixed time scale Δt from the starting time axis t0, and Δt is related to the reaction time frequency set by the gravity sensor. The change line 310 of the motion intensity in the figure shows that the horizontal motion is not greater than the maximum motion intensity at the end of the longest time axis (identical to the space-time boundary shown in FIG. 3A), and accumulating to this dotted line 304 is zeroed during operation. In addition, considering that the normal movement has continuity and characteristics of monotonic function with monotonic increasing/decreasing in the three-axes direction (X, Y and Z directions), while jitter movement has the characteristics of respective repeated non-monotonic function in the three-axes direction (X, Y and Z directions). By integrating the influence of gravity into the calculation, the positive and negative offset in three directions of motion in a period of time can be obtained, which can more reliably distinguish the difference between jitter and motion and prevent misoperation. Please refer to FIG. 3C and FIG. 3D for the distinguishing method. FIG. 3C is the discrimination for jitter. In FIG. 3C, the change lines of the motion intensity of horizontal motion, lateral motion and vertical motion (expressed as 310a, 311a and 312a respectively) are drawn. The measurement starts when the horizontal motion is not zero by using Euler anti-jitter, triaxial fusion algorithm. When the lateral motion is not zero from the initial calculation to the second order, it is added to the time measurement. Then, when the vertical motion is not zero from the initial calculation to the fourth order, it is added to the time measurement. Before reaching the motion intensity marked line 310a of the time axis, the three motion directions begin to reverse, end this cycle, and the fusion calculation returns to zero. FIG. 3 D shows the discrimination of motion. In FIG. 3 D, the change lines of the motion intensity of horizontal motion, lateral motion and vertical motion (expressed as 310b, 311b and 312b respectively) are drawn, and the measurement starts when the lateral motion is not zero by using the Euler anti-jitter-triaxial fusion algorithm. When the horizontal motion is not zero from the initial calculation to the second order, it is added to the time measurement. Then, when the vertical motion is not zero from the initial calculation to the fourth order, it is added to the time measurement. The horizontal motion excess increases steadily (change line of motion intensity 310b), and the vertical motion is reset as the starting point to increase the second-order simulation level from the second-order. When the horizontal movement reaches the condition of stable increase, the interpretation of this cycle is effective. The description of the above discrimination methods can be summarized as that the calculation of environmental transformation is performed within a period of time by using the Euler angular velocity. By judging the changes of pitch angle, yaw angle and roll angle by the calculated environmental transformation, the intensity threshold of anti-jitter can be preset and evolved several times within the period of time, so as to achieve the purpose of anti-jitter. The performance of stability and reliability of the proposed calculation method is far more accurate than the conventional method which uses bias value estimated on the gravity sensor, gyroscope or accelerometer by using the set threshold valve, and the invention will not produce the error of single or several data accumulation due to the exclusion calculation below the threshold valve. The six axes (three-axes accelerometer, three-axes gyroscope) and nine axes gravity sensors (nine axes, i.e. the original six axes plus three-axes magnetometer) must have the above performance of identifying jitter, which can be clearly disclosed by the processor of the invention.

Figure 4:
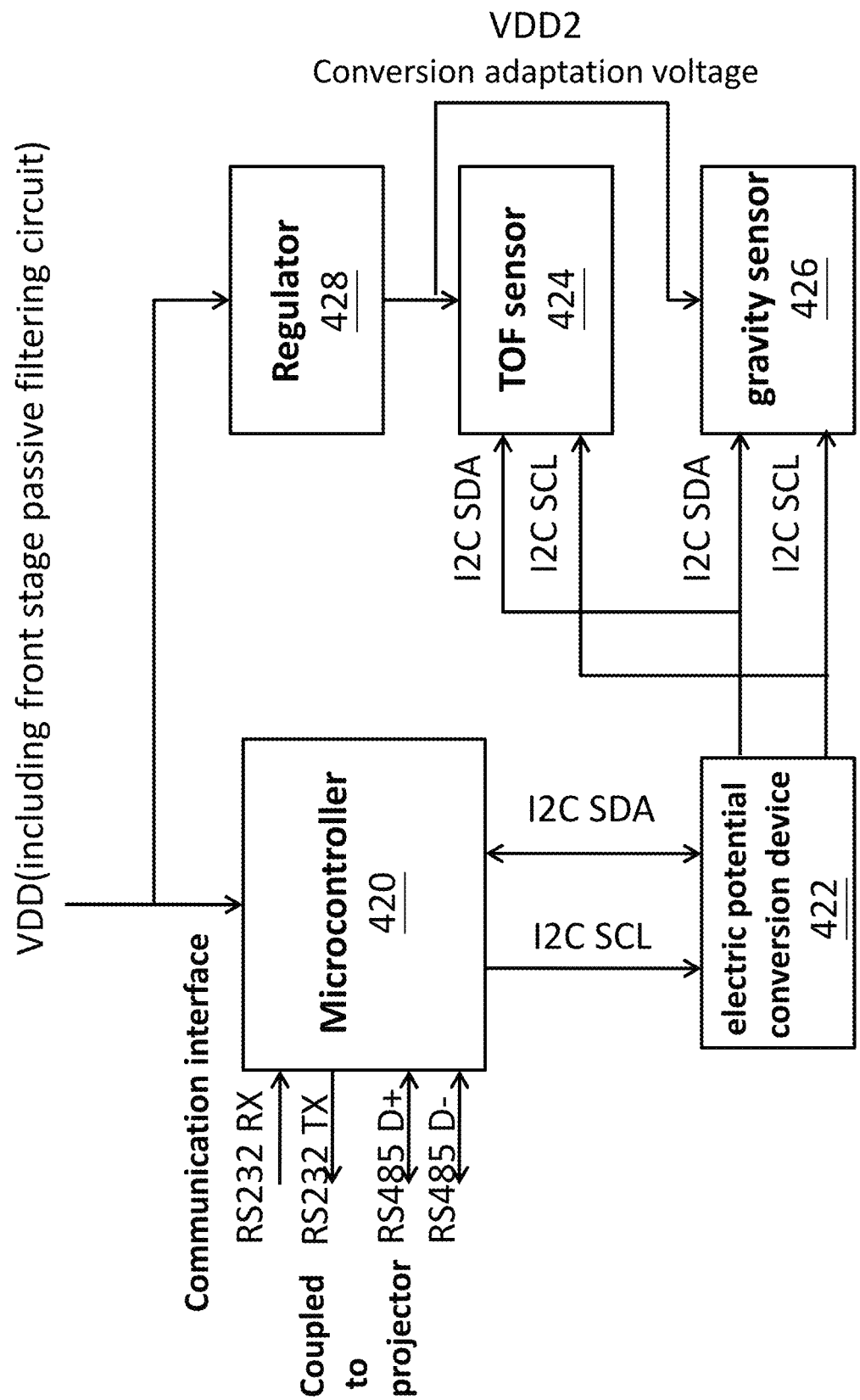
FIG. 4 shows a functional block diagram of a hardware system of the invention.

FIG. 4 is the functional block diagram of the hardware system of the invention. The main operation unit is a programmable logic microcontroller 420 coupled to an electric potential conversion device 422 through the I2C standard protocol. The electric potential conversion device 422 is parallelly coupled to a TOF sensor (ranging device) 424 and a gravity sensor (G sensor) 426. The power supply is provided by a low dropout linear regulator (LDO) 428 for low-voltage driving the sensors. After voltage stabilization and post stage filtering by the LDO 428, cleaner power supply, suppression of electrical noise and ripple give a stable working environment the sensors. For the communication of projectors or other application equipment, the invention adopts RS232 and reserved RS485. RS232 is the common communication interface for internal and external of projector, which facilitates the combination with the system and the improvement of commodity development efficiency. RS485 is a half-duplex differential signal, which is suitable for large theater platform and can support external devices for long-distance installed on projector.

Figure 5:
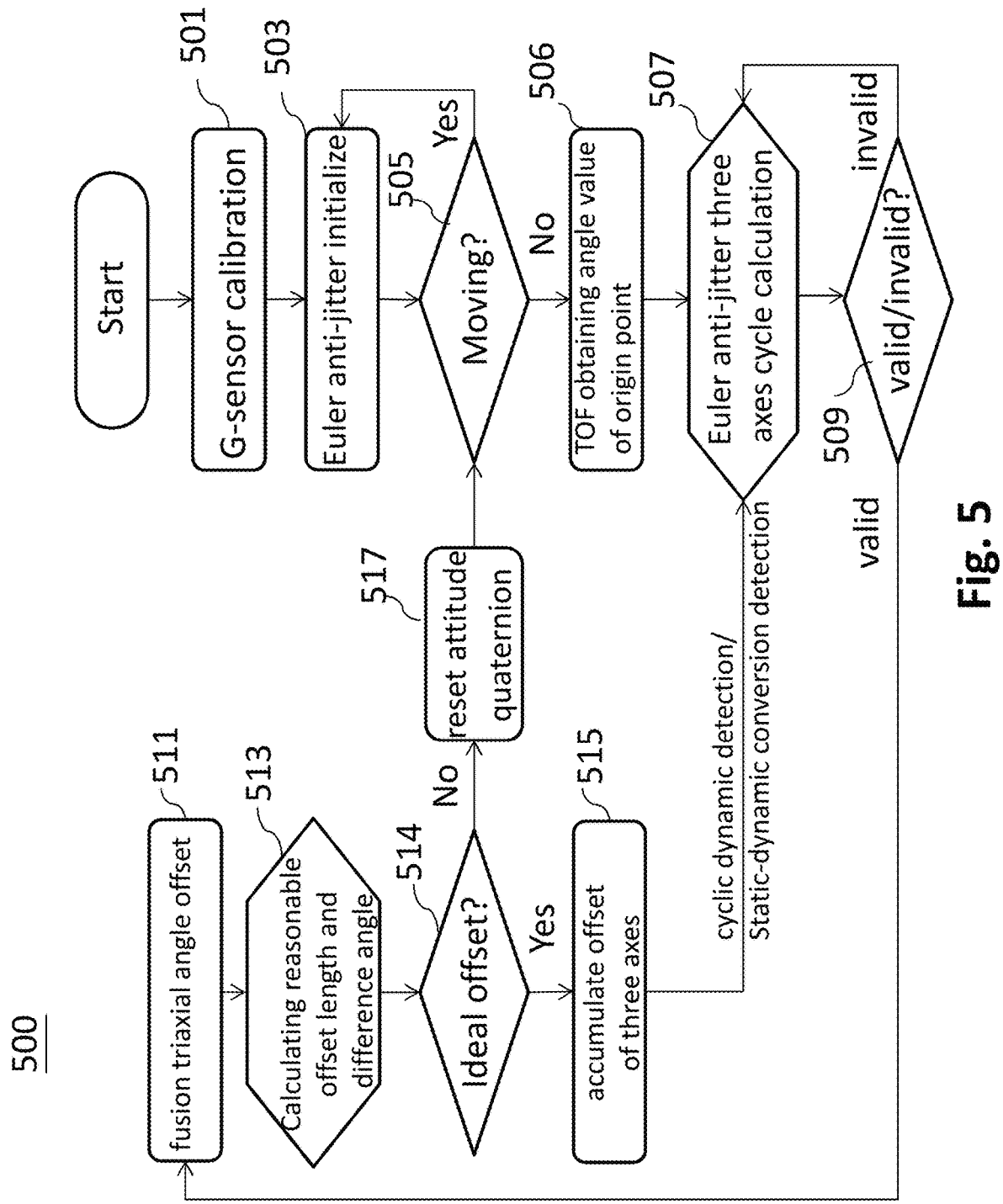
FIG. 5 shows a flow chart of a system program of the invention.

FIG. 5 is a flow chart 500 of system program of the present invention. The first process is to automatically complete the auto-calibration of G sensor (step 501), initialize the change rate of Euler angle (step 503) and start the pre-anti-jitter cycle detection of origin point detection (step 505→506→507). When the condition of anti-jitter is established, it is determined to be an effective change rate of Euler angle (step 509). Then, it performs the original calculation of fusion triaxial angle offset (step 511). Next, it takes the reasonable turning radius from the origin of the offset centerline to the projector, and converting the maximum and minimum reasonable ranges of the offset angle (the cumulative time tolerance of the centerline is at the calculation cut-off point of anti-jitter detection) (step 513). If it is determined to be an ideal offset angle (step 514), accumulate the offset of the three axes to the new coordinate position (step 515), and then continue the cyclic anti-jitter detection (step 507). If it is determined not to be an ideal offset angle (step 514), it is determined that the excessive offset angle may be caused by machine falling, being carried, transferring site erection or environmental changes affected by other factors, then reset the attitude quaternion (step 517) and recheck whether it is moving, get relocation at a new positioning point. The system of the invention is designed in close combination with the related operation method of the change rate of Euler angle. Any reasonable dynamic, static or environmental conversion and using the change rate of Euler angle to complete operation of the projector belongs to the scope of the invention.

To sum up, the invention describes a system combined with a projector, which shows more efficiency than the traditional manual method or coordinate positioning method. In addition to the processor of the invention, there is no need to add other equipment with positioning sensing, the correction process will not produce any pattern of masking picture, and the projector does not need to be equipped with a camera. There is no need to erect before use or install any scanning/positioning device due to environmental changes. It can be placed and used at any time. After static placement, slight or very slight dynamic adjustment can be carried out, and the image and frame displayed on the projection screen in the adjustment process can meet the predetermined projection range.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A method of automatic keystone correction for projector system, comprising:
    configuring a ranging device, a gravity sensor and a microprocessor in a projector system;
    using said ranging device to obtain an included angle between horizontal and vertical of a first static field of view projected by said projector system to a plane for static positioning;
    obtaining a pitch angle, a yaw angle and a roll angle by said gravity sensor through a change rate of Euler angle to dynamically change horizontal and vertical changes of each sampling line to obtain a real-time projection picture; and
    measuring four sides and a center line of said real-time projection picture by said ranging device to correct a final included angle in the horizontal and vertical directions.

2. The method of claim 1, wherein said ranging device is a scanning multipoint TOF ranging device.

3. The method of claim 1, wherein said gravity sensor is a six axes gravity sensor integrated with accelerometer and gyroscope.

4. The method of claim 3, wherein said gravity sensor comprises a magnetometer.

5. The method of claim 1, further comprising calculating environmental transformation within a period of time by using the Euler angular velocity, judging changes of said pitch angle, said yaw angle and said roll angle by said calculated environmental transformation, and presetting an intensity threshold of anti-jitter in a period of time.

6. The method of claim 1, wherein said microprocessor is coupled to an electric potential conversion device.

7. The method of claim 6, wherein said electric potential conversion device is coupled to said ranging device and said gravity sensor.

8. The method of claim 7, wherein a low dropout linear regulator is coupled to said ranging device and said gravity sensor.

9. The method of claim 1, wherein said microprocessor is a computer central processing device or a field programmable gate array.

10. The method of claim 1, wherein said microprocessor is a built-in Scalar embedded microprocessor.

11. A method of automatic keystone correction for projector system, comprising:
    configuring a ranging device, a gravity sensor and a microprocessor in a projector system;
    using said ranging device to obtain an included angle between horizontal and vertical of a first static field of view projected by said projector system to a plane for static positioning;
    obtaining a pitch angle, a yaw angle and a roll angle by said gravity sensor through a change rate of Euler angle to dynamically change horizontal and vertical changes of each sampling line to obtain a real-time projection picture;
    measuring four sides and a center line of said real-time projection picture by said ranging device to correct a final included angle in the horizontal and vertical directions; and
    auto-calibrating of said gravity sensor, initializing said change rate of Euler angle and pre-anti-jitter cycle detection.

12. The method of claim 11, wherein said ranging device is a scanning multipoint TOF ranging device.

13. The method of claim 11, wherein said gravity sensor is a six axes gravity sensor integrated with accelerometer and gyroscope.

14. The method of claim 13, wherein said gravity sensor comprises a magnetometer.

15. The method of claim 11, further comprising calculating environmental transformation within a period of time by using the Euler angular velocity, judging changes of said pitch angle, said yaw angle and said roll angle by said calculated environmental transformation, and presetting an intensity threshold of anti-jitter in a period of time.

16. The method of claim 11, wherein said microprocessor is coupled to an electric potential conversion device.

17. The method of claim 16, wherein said electric potential conversion device is coupled to said ranging device and said gravity sensor.

18. The method of claim 17, wherein a low dropout linear regulator is coupled to said ranging device and said gravity sensor.

19. The method of claim 11, wherein said microprocessor is a computer central processing device or a field programmable gate array.

20. The method of claim 11, wherein said microprocessor is a built-in Scalar embedded microprocessor.

* * * * *